(12) United States Patent
Kamstrup

(10) Patent No.: US 11,659,314 B2
(45) Date of Patent: *May 23, 2023

(54) HEADSET LOCATION-BASED DEVICE AND APPLICATION CONTROL

(71) Applicant: GN Audio A/S, Ballerup (DK)

(72) Inventor: Lisa Roerbaek Kamstrup, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 25 days.

This patent is subject to a terminal disclaimer.

(21) Appl. No.: 17/209,492

(22) Filed: Mar. 23, 2021

(65) Prior Publication Data

US 2021/0211799 A1 Jul. 8, 2021

Related U.S. Application Data

(63) Continuation of application No. 16/659,901, filed on Oct. 22, 2019, now Pat. No. 11,039,239.

(30) Foreign Application Priority Data

Oct. 25, 2018 (EP) .................................... 18202475

(51) Int. Cl.
  *H04R 1/10* (2006.01)
  *H04W 4/80* (2018.01)
  *G06F 3/16* (2006.01)
  *H04L 67/02* (2022.01)
  *H04L 67/306* (2022.01)
  (Continued)

(52) U.S. Cl.
  CPC ........... *H04R 1/1041* (2013.01); *G06F 3/165* (2013.01); *H04L 67/02* (2013.01); *H04L 67/306* (2013.01);
  (Continued)

(58) Field of Classification Search
  CPC .... H04R 2420/07; H04R 5/033; H04R 29/00; G06F 21/35
  (Continued)

(56) References Cited

U.S. PATENT DOCUMENTS 9,830,930 B2 11/2017 Miller
2007/0165875 A1* 7/2007 Rezvani .............. H04M 1/6066
  381/74
(Continued)

FOREIGN PATENT DOCUMENTS

WO 2017117288 A1 7/2017

OTHER PUBLICATIONS

Extended European Search Report issued in European patent application No. 18202475.2, dated May 10, 2019, 8 pages.

*Primary Examiner* — Alexander Krzystan
(74) *Attorney, Agent, or Firm* — Hamre, Schumann, Mueller & Larson, P.C.

(57) ABSTRACT

Disclosed is a headset for audio transmission. The headset is configured to be worn by a user. The headset comprises a speaker for sound transmission into the users ear. The headset comprises a wireless communication unit for communication with an external device. The headset comprises a connection to a location-based service software, the location-based service software is configured for controlling at least one headset feature based on location data of the headset. The headset comprises a processing unit. The processing unit is configured for obtaining current location data of the headset. The processing unit is configured for enabling the location-based service software to detect if the current location data of the headset corresponds to a geographic region for which a first geo-fence is defined by the user. The processing unit is configured for changing the at least one headset feature, if a change criterion associated with the first geofence is satisfied; wherein the change of at least one headset feature is defined by the user.

13 Claims, 6 Drawing Sheets

(51) Int. Cl.
*H04R 1/08* (2006.01)
*H04W 4/021* (2018.01)
*H04L 67/52* (2022.01)
*H04L 67/53* (2022.01)
*H04L 67/55* (2022.01)

(52) U.S. Cl.
CPC .............. *H04L 67/52* (2022.05); *H04L 67/53* (2022.05); *H04L 67/55* (2022.05); *H04R 1/08* (2013.01); *H04R 1/1008* (2013.01); *H04W 4/021* (2013.01); *H04W 4/80* (2018.02); *H04R 2420/07* (2013.01); *H04R 2460/07* (2013.01)

(58) Field of Classification Search
USPC ............................................ 381/58, 74, 310
See application file for complete search history.

(56) References Cited

U.S. PATENT DOCUMENTS

| | | | |
|---|---|---|---|
| 2008/0001816 A1 | 1/2008 | Wang | |
| 2014/0126733 A1* | 5/2014 | Gauger, Jr. | G10K 11/17835 381/71.6 |
| 2015/0382097 A1 | 12/2015 | Åstrand | |
| 2016/0125869 A1 | 5/2016 | Kulavik | |
| 2017/0060880 A1 | 3/2017 | Sabin | |
| 2017/0147281 A1 | 5/2017 | Klimanis | |
| 2018/0034951 A1 | 2/2018 | Boesen | |
| 2020/0067868 A1* | 2/2020 | Werner | H04L 51/212 |
| 2020/0068335 A1* | 2/2020 | Eronen | H04R 5/033 |
| 2021/0256951 A1* | 8/2021 | Tanaka | G10K 11/17823 |

* cited by examiner

HEADSET LOCATION-BASED DEVICE AND APPLICATION CONTROL

FIELD

The present disclosure relates to a system, a software application, a method and a headset for audio transmission. The headset is configured to be worn by a user. The headset comprises a speaker for sound transmission into the user's ear, a transceiver or a radio communication unit for communication with an external device, a connection to a location-based service software, the location-based service software is configured for controlling at least one headset feature based on location data of the headset, and a processing unit.

BACKGROUND

Headsets can be used in different situations. Users can wear their headset in many different environments, e.g. at work in an office building, at home when relaxing, on their way to work, in public transportation, in their car, when walking in the park etc. Furthermore, headsets can be used for different purposes. The headset can be used for audio communication, such as telephone calls. The headset can be used for listening to music, radio etc. The headset can be used as a noise cancelation device in noisy environments etc.

Depending on which environment or situation the user is in when wearing the headset, and/or depending on the purpose of wearing the headset, different audio settings in the headset may be relevant. Audio settings in a headset may e.g. be sound mode settings, noise cancellation etc.

Today, users wearing headsets need to change headset settings themselves or need to rely on the headset performing a satisfactory acoustic detection of the environment.

U.S. Pat. No. 9,830,930 BB discloses systems and methods providing ambient awareness. An example method includes receiving an acoustic signal representing at least one captured ambient sound and determining that at least one triggering event has occurred based at least on the acoustic signal, a user profile, and a user context. In response to the determination, the method proceeds to modify, based on the at least one triggering event, the acoustic signal which represents the at least one captured ambient sound. The modified acoustic signal is provided to at least one ear canal of a user. In an exemplary embodiment, ambient sounds are selectively passed through automatically to a user based on certain triggering events, allowing a user to be able to hear sounds outside of headset while the user is wearing the headset. The triggering events may be selected by the user, for example, using a smartphone application.

US2017060880A discloses a computer-implemented method that includes receiving identification information associated with a geographic location. The identification information includes one or more features that affect an acoustic environment of the geographic location at a particular time. The method also includes determining one or more parameters representing at least a subset of the one or more features, and estimating at least one acoustic parameter that represents the acoustic environment of the geographic location at the particular time. The at least one parameter can be estimated using a mapping function that generates the estimate of the at least one acoustic parameter as a weighted combination of the one or more parameters. The method further includes presenting, using a user-interface displayed on a computing device, information representing the at least one acoustic parameter estimated for the geographic location for the particular time.

US2016125869A discloses a system comprising automatic noise cancellation circuitry and interface circuitry operable to provide an interface via which a user can configure which sounds said automatic noise cancelling circuitry attempts to cancel and which sounds said automatic noise cancelling circuitry does not attempt to cancel. The interface circuitry may be operable to provide an interface via which a user can select a sound to whitelist or blacklist. The interface circuitry may be operable to provide an interface via which a user can increase or decrease an amount of noise cancellation that is desired. The interface circuitry may be operable to provide an interface via which a user can select from among three or more levels of noise cancellation.

US2018034951A discloses an earpiece including an earpiece housing, a speaker associated with the ear piece housing, a microphone associated with the ear piece housing a wireless transceiver disposed within the ear piece housing and a processor disposed within the ear piece housing. The earpiece is configured to connect with a vehicle using the wireless transceiver and after connection with the vehicle automatically enter a driving mode. In the driving mode, the earpiece senses ambient sound with the microphone and reproduces the ambient sound at the speaker and the driving mode may be locked in place during driving.

Thus, there is a need for a headset allowing for improved headset settings.

SUMMARY

Disclosed is a headset for audio transmission. The headset is configured to be worn by a user. The headset comprises a speaker for sound transmission into the user's ear. The headset comprises a wireless communication unit for communication with an external device. The headset comprises a connection to a location-based service software, the location-based service software is configured for controlling at least one headset feature based on location data of the headset. The headset comprises a processing unit. The processing unit is configured for obtaining current location data of the headset. The processing unit is configured for enabling the location-based service software to detect if the current location data of the headset corresponds to a geographic region for which a first geo-fence is defined by the user. The processing unit is configured for changing the at least one headset feature, if a change criterion associated with the first geofence is satisfied; wherein the change of at least one headset feature is defined by the user.

Thus, it is an advantage that the headset is configured for automatically changing headset features, such as sound modes, when the user wearing the headset enters or exits a geographical region for which the user previously has defined or set a geofence.

It is an advantage that the user wearing the headset in a location do not have to interact with the headset itself and/or with his/her smart phone, when headset settings need to be changed. The headset automatically changes the headset features or settings in accordance with the user's preferences.

Even though acoustic detection can be used as a trigger for changing the audio settings in a headset, audio research has big challenges with acoustic detection of environment. Thus, in prior art, the acoustic environment is analysed and settings are made which fits the acoustic environment.

However as acoustic detection has big challenges and is not always precise, satisfactory or correct, the resulting audio setting may not be optimal for the user.

Thus, it is an advantage of the present headset that users can define automatic settings themselves. Furthermore, it is an advantage that the users can define the headset settings based on location and their own preferences, instead of based on a detected acoustic environment.

Thus, it is an advantage of the present headset, method and system, that these provide a way to get automated location-relevant settings, and instead of using prior art acoustic detection, geofencing data is used in the present invention.

The location-based service (LBS) may be arranged as an installed software application, e.g. app, on the electronic device. The electronic device may be connected with the headset. Thus, the headset may be configured to communicate with the electronic device.

The location-based service (LBS) may be arranged as a cloud service, which the headset is configured to communicate with directly. Alternatively, the location-based service (LBS) arranged as a cloud service may be loaded locally in the headset.

The headset may be a tethered headset or an untethered headset. A tethered headset is connected, e.g. wirelessly, to the electronic device, the electronic device acting as a host for the headset, where the electronic device is providing an Internet connection. An untethered headset is configured for Internet connection itself, thus an untethered headset is WiFi/4G LTE enabled and thus host-device free.

The location-based service may be a back-end application for the headset.

The processing unit is configured for enabling the location-based service software to detect if the current location data of the headset corresponds to a geographic region for which a first geo-fence is defined/set by the user. The processing unit is configured for changing the at least one headset feature, if a change criterion associated with the first geofence is satisfied; wherein the change of at least one headset feature is set/defined by the user.

Thus, it is an advantage that the user sets or defines his/her own geofences.

Furthermore, the user may set or define his/her own preferences associated with the regions defined by the geofences. The preferences may regard sound mode, noise cancellation, which notifications are allowed through, which phone calls are allowed through, etc.

The geofences and/or preferences may be a front-end application for the headset. The geofences and/or the preferences may be set, defined, changed, or managed by the user in a user interface.

If the headset is untethered, and the user wishes to set his/her geofences and/or preferences within these geofences by using, e.g. only, the headset, the user interface for this action or setting may be performed via the user interface of the headset. The headset user interface may be a button-, gesture- and/or voice-input user interface. Thus, the user may provide button-, gesture- and/or voice-input for defining or setting his/her geofences and/or preferences. Thus, the user may provide the settings on location in the regions where the geofences should apply. For example, when the user walks from home to the train station, the user may define/set a geofence by providing button-, gesture- and/or voice-input on the headset user interface, when exiting his/her home, which geofence could apply from outside the user's home and to the train station. Thus, the geofences and/or preferences may be provided when the user is using or wearing the headset in the region with the (desired) geofences.

Alternatively, if the headset is tethered, the user may provide his/her geofences and/or preferences via a connected electronic device, e.g. host device. The connected device may have a display, such as a touch screen, displaying a user interface on which the user can provide the desired geofences and/or preferences. These geofences and/or preferences may be provided on this visual user interface before the user is using or wearing the headset in the region with the (desired) geofences. Alternatively, the geofences and/or preferences may be provided on this visual user interface while the user is using or wearing the headset in the region with the (desired) geofences, if the user holds the connected device in his/her hand while wearing the headset. In this case, the user can provide the geofences and/or preference using touch gestures on the visual user interface on the connected electronic device.

Thus, it is an advantage that the user can define and set geofences and/or preference via a connected host electronic device and/or via the headset itself.

The external device, which the headset is configured for communication with, may be an electronic device, such as a handheld electronic device and/or a portable electronic device such as a smart phone, such as the user's smart phone. The external device may be a computer unit, such as a personal computer, a stationary computer etc. The external device may be a server, such as a cloud server.

The wireless communication unit may be a radio communication unit and/or a transceiver. The wireless communication unit may be configured for Bluetooth (BT) communication, for WiFi communication, such as 3G, 4G, 5G etc.

The connection to a location-based service software may be means for connecting to a location-based service software, and/or the headset may be configured for connecting to a location-based service software.

The headset feature may be a sound mode. Changing a headset feature may include changing a state of a headset feature, changing a sound mode setting, etc.

The processing unit is configured for obtaining current location data of the headset. The current location of the headset may be obtained from a positioning system, such as GPS, and via Internet connection, such as WiFi, in the headset and/or in the associated or connected electronic device, such as a smart phone.

The processing unit is configured for enabling the location-based service software to detect if the current location data of the headset corresponds to a geographic region for which a first geo-fence is defined/set by the user. The current location data of the headset corresponds to a geographic region for example when the user in entering or exiting a defined/set geofence.

The first geofence is defined/set by user for example using a user interface, such as a user interface on the headset itself, e.g. mechanical buttons etc., and/or such as a user interface on the connected electronic device, such as a software application, e.g. an app. The first geofence may be pre-defined or preset by the user before the user is entering the geofence, e.g. at home before wearing the headset. The first geofence may be defined or set by the user when the user is entering and/or exiting the geofence, e.g. on location.

The processing unit is configured for changing the at least one headset feature, if a change criterion associated with the first geofence is satisfied; wherein the change of at least one headset feature is set/defined by the user. The processing unit may be configured for changing the headset feature itself and/or changing the state of the headset feature.

According to an aspect, a system is disclosed. The system comprises the headset as disclosed above, and in some embodiments, the system comprises a software application, such as an app, configured to be run or executed on an electronic device associated with the headset. The electronic device may be the user's smart phone, which is connected, such as paired with the headset.

The software application is e.g. an app, such as a front-end application, where the user can define regions in the form of geofences, e.g. on a map in the app, wherein certain headset features and/or headset setting preferences can be defined or set to provide rules. For example, a desired Sound Mode level can be defined for a certain geographical region. A sound mode level may for example be a "hear through level" which the user can set for e.g. the geographical region of his/her workplace.

The user's headset may then automatically, via the back-end application, know when the user enters or exits a region for which a geofence has been defined by the user. The headset may then automatically trigger a headset feature change or a state change in the headset. This headset feature change or state change can affect all or only some selected headset feature, this depends on user preference settings.

The automated state change in the headset may use the same communication 'route' as used for call control today. Thus, the current Bluetooth SCO-protocol may be used. Furthermore, a new protocol, e.g. a headset manufacturer protocol, may be added on top of the current Bluetooth-SCO protocol, which may enable the headset manufacturer, to send commands from the back-end and/or the front-end application to the headset, with the result of the headset automatically changing settings.

For example, if the user has set a headset feature being a Sound Mode, e.g. a hear-through sound mode for the headset in a specific region, the effect of leaving or entering that region, may be that the headset automatically—without the user having to give input to neither headset nor front-end application—change from one Sound Mode to another Sound Mode.

Setting triggers for when to change a headset feature may happen in the front-end app. Triggers may effect only the headset's generic/built-in settings/features. Alternatively and/or additionally, the triggers can effect change of settings in applicable third-party applications installed on the user's electronic device, e.g. smart phone.

Thus, the user leaving or entering a region can also create a change in for example a planned travel route, change music tracks/playlists, effect calendar content, alter/activate shopping push notifications or purchase plans or e.g. affect health states/recommendations etc. In relation to planned travel route, the headset may pair information on the time of entering/exiting a region from back-end application with information from planned travel route. A trigger or consequence may be, that the user may get a voice notification in the headset, if the planned travel conflicts with actual time and/or location. This may furthermore provide that a 'reroute advice' or 'speed-up-pace advice' is given to the user via push notifications, such as voice prompts, in the headset.

In an example with a calendar planner, the user can define that within certain geographical regions, e.g. a geofence defined around the user's home, the user is not interested in being approachable via phone calls, and/or text messages and/or emails from one or more predefined contacts. Such a definition may support e.g. the user's work/life balance.

Today, the user must go into different apps to keep content/preferences relevant according to their current context.

It is an advantage of the present headset, method, software application and system that the user shall only set the desired headset feature(s) and/or his/her preferences once, i.e. one time, within each region. When the user subsequently is in the same region, the headset will follow the defined headset features and/or user preferences automatically, without requiring user action. The user will obtain much more context relevant information as well as context-relevant headset capabilities.

Furthermore, the user may define, e.g. in the visual user interface in an app on the electronic device, which third-party apps that should be affected by each type of headset feature and/or by the headset state. Likewise, the user may define which third party apps should be allowed to affect the headset feature and/or headset state. These definitions of third party app affections may alternatively and/or additionally be based on the location of the headset user, e.g. based on the headset user's presence in a defined geofence.

Thus, it is an advantage that the headset uses a location-based service for detecting the location of the headset user, and based on the location of the user, the headset automatically changes a headset feature, such as sound level, according to a predefined setting associated with the location, which is defined by a geofence.

A location-based service (LBS) is a software-level service that uses location data to control features. LBS may be used as an information service and may thus have a number of uses in social networking today as information, in entertainment or security, which is accessible with mobile devices through the mobile network and which uses information on the geographical position of the mobile device.

In the present invention, LBS may be accessible with the electronic device, e.g. smart phone host device, through the mobile network, e.g. WiFi/4G, and using information on the geographical position of the electronic device.

In the present invention, LBS may be accessible with the headset itself through e.g. the WiFi/4G network of the headset and using information on the geographical position of the headset.

LBS include services to identify a location of the person wearing the headset, i.e. by determining the location of the headset and/or determining the location of the associated electronic device.

LBS may provide the ability to open and close specific data objects based on the use of location and/or time as controls and triggers or as part of complex cryptographic key or hashing systems and the data they provide access to.

With control plane locating in LBS, sometimes referred to as positioning, the headset manufacturer or mobile phone service provider gets the location of the user based on the radio signal delay of the closest cell-phone towers, for phones without GPS features. Instead of using trilateration, LBS services may use a single base station, with a "radius" of inaccuracy, to determine a headset or smart phone's location. In headsets or smart phones, which have an integrated A-GPS chip, the GPS may be used to determine the location.

Different methods can be used to find the location of the headset using LSB. A solution is LBS based on GPS or an alternative satellite navigation system. It is used to maintain knowledge of the exact location, and requires that the headset and/or the associated electronic device is GPS-equipped. GPS is based on the concept of trilateration, a basic geometric principle that allows finding one location if one knows its distance from other, already known locations.

Another solution is self-reported positioning, where instead of tracking technologies, the user may mark their own location on a map. This may also be known as a user "check-in".

Yet another solution is Near LBS (NLBS), which involves local-range technologies such as Bluetooth low energy (BLE), WLAN, infrared and/or RFID/Near field communication technologies, which may be used to match the headset and/or the associated electronic device to nearby services. This application allows the user to access information based on his/her surroundings, which may be especially suitable for using inside closed premises, restricted or regional area.

Another alternative is an operator- and GPS-independent location service based on access into the deep level telecoms network (SS7). This solution may enable determination of geographical coordinates of mobile phone numbers by providing operator-independent location data and works also for electronic devices, which are not GPS-enabled.

Other local positioning systems and indoor positioning systems are available, especially for indoor use. GPS and GSM may not work very well indoors, so other techniques may be used indoor, including co-pilot beacon for CDMA networks, Bluetooth, UWB, RFD and Wi-Fi.

The current location data of the headset may correspond to a geographic region for which a geofence is defined or set by the user.

A geo-fence is a virtual perimeter for a real-world geographic area. A geo-fence may be dynamically generated, such as in a radius around a point location, or a geo-fence may be a predefined set of boundaries, such as school zones or neighborhood boundaries.

The use of a geo-fence is called geo-fencing, and in the present invention, the usage involves a location-aware device, i.e. the headset and/or the associated electronic device, of a location-based service (LBS) user entering or exiting a geo-fence. The user entering or exiting a geofence may trigger a change in the headset feature, if a change criterion is defined for the geofence. Furthermore, this may trigger an alert to the headset user, e.g. a voice prompt in the headset speakers, and/or an SMS to the associated electronic device.

Geofencing allows the user of the system to draw zones around places of work, home, neighborhood, shopping sites, transportation, such as the user's way to/from work in a road or railway, etc.

The user may draw the geofence zones on an electronic map in a visual user interface, e.g. in an app on the electronic device associated with the headset.

In some embodiments, the change criterion for changing the headset feature is satisfied, if the user, wearing the headset, enters or exits the geographic region for which the first geo-fence is defined.

In some embodiments, the headset feature to be changed is a sound mode of the headset, whereby the sound mode is changing from a first sound mode to a second sound mode.

In some embodiments, the change of the headset feature is performed by a call control communication protocol, and wherein the call control communication protocol comprises a Bluetooth-SCO protocol.

Synchronous connection-oriented (SCO) link is the type of radio link used for voice data. An SCO link is a set of reserved timeslots on an existing ACL (Asynchronous Connection-Less) link. Each device transmits encoded voice data in the reserved timeslot. There are no retransmissions, but forward error correction can be optionally applied. SCO packets may be sent every 1, 2 or 3 timeslots.

Besides the current Bluetooth-SCO protocol, a headset manufacturer protocol may be added to the call control communication protocol.

In some embodiments, the change of the headset feature is performed by a call control communication protocol; and wherein the call control communication protocol comprises a protocol enabling sending commands from back-end applications and front-end applications to the headset, thereby changing the headset feature.

The call control communication protocol may be the current Bluetooth-SCO protocol and adding to this a headset manufacturer protocol. Thus, the headset manufacturer may be enabled by the protocol to send commands from the back-end applications and/or from the front-end applications to the headset. The back-end applications may be geofencing service using passive, e.g. cellular data/Wi-Fi, and active, e.g. GPS/RFID, geofences. The geofencing services may be provided by the headset manufacturer. The front-end applications may be location-based device control, where the user defines which third-party app(s) on the electronic device, e.g. the smart phone, should link with this location-based device control service. The location-based device control may be provided by the headset manufacturer.

In some embodiments, the location-based service software is further configured for controlling triggers and/or notifications from third-party applications based on location data of the headset.

For example, if the user enters a geofence surrounding a shopping centre, the headset receives notifications from the shopping centre, if the user has made this setting, i.e. allowing notifications from third-party apps, for the headset for the geofence defining the shopping centre.

In some embodiments, the location data of the headset affects a change in settings in applicable third-party applications on the electronic device based on the user's predefined settings.

For example, if the user listens to music in the headset, and where the music is streamed from a music app, the music app may change from playing soft music to up-tempo music, when the user enters a geofence defining the user's gym or fitness centre.

In some embodiments, a change in settings in the applicable third-party applications on the electronic device is selected from among:
  change in planned travel route in a travel planner app;
  change music tracks, playlists, and/or radio stations in a music streaming app;
  change calendar content in a calendar app;
  change shopping push notifications in shopping services app;
  change health states and/or recommendations in health tracking services.

The processing unit may be configured for determining concordance and/or divergence between a time point and location of the user entering/exiting a specific region, such as geofence, and a planned travel route.

The headset may be configured for providing an audio notification in the speaker based on the determination of concordance and/or divergence between a time point and location of the user entering/exiting a specific region and a planned travel route.

A change in settings in a calendar app may comprise defining regions within which inquiries/approaches, such as e.g. phone call, text message (SMS), and/or emails, from predefined contacts are blocked. This may support work/life balance, for example if the user has in his/her calendar that he/she is at home, the headset may block calls from work. Likewise, if user has in the calendar that he/she is at vacation, the headset may block calls from work. Furthermore, if the user has in the calendar that he/she is at work, the headset may block calls from friends etc.

In some embodiments, the location data of the headset is determined in the headset, when the headset comprises means for location determination; and/or wherein the location data of the headset is determined in the electronic device, when the electronic device comprises means for location determination.

The location determination may be performed, e.g. outdoor, by GPS and/or WIFI by the headset itself or by the electronic device. The location determination may be performed, e.g. indoor by LTE, RFID etc.

In some embodiments, the headset comprises an internet connection such that the headset is configured for connection to the internet.

The internet connection may be WIFI, LTE etc.

According to an aspect, disclosed is a software application for an electronic device associated with a headset. The software application is configured for enabling a user to define settings for a location-based service software for controlling at least one headset feature based on location data of the headset. The software application comprises a user interface comprising display of a map for a geographic area enabling the user to define one or more geo-fences including a first geo-fence for a geographic region on the map. The software application comprises a user interface enabling the user to define a change of at least one headset feature based on the location data of the headset. The headset feature is configured to be changed, if the user, wearing the headset, enters or exits the geographic region for which the first geo-fence is defined.

The user interface comprising display of a map may be a first user interface, or a map user interface, or a geofence user interface etc.

The user interface enabling the user to define a change of a headset feature may be a second user interface, a headset feature user interface, a settings user interface etc.

The first user interface and the second user interface may be same user interface or different user interfaces.

The software application may be an app on the user's electronic device, such as smart phone. Using an app on the user's electronic device may be the case when the headset is Bluetooth connected to the electronic device with WiFi.

As an alternative to using an app on the user's electronic device, e.g. smart phone, for defining the geofences and/or the changing of headset features, the user may use a headset user interface for defining the geofences and/or the changing of headset features. The headset user interface may comprise buttons on the headset, voice control in the headset, gesture control of the headset etc. The user may define the geofences while the user is wearing the headset, by that when the user enters a geographic regions where the user wishes a geofence to begin, the user may indicate to the headset that the geofence shall start here, e.g. by pushing a button on the headset user interface or making a voice prompt to the headset. When the user wishes the geofence to end, the user may again indicate to the headset that the geofence shall stop here, e.g. by pushing a button on the headset user interface or making a voice prompt to the headset.

In some embodiments, the software application comprises a user interface enabling the user to select/define one or more third-party applications, which are affected by the headset feature and/or by the location-data of the headset. This may be performed by linking with the location-based device control service.

The user interface enabling the user to select third-party applications to be affected may be a third user interface. The first, second and third user interfaces of the software application may be the same user interface or different, separate user interfaces.

In some embodiments, the software application comprises a user interface enabling the user to select/define one or more third-party applications, which are configured to affect the headset feature based on the location-data of the headset. This may be performed by linking with the location-based device control service.

The user interface enabling the user to select third-party applications to affect may be a fourth user interface. The first, second, third and fourth user interfaces of the software application may be the same user interface or different, separate user interfaces.

According to an aspect, disclosed is a system comprising a headset and a software application configured to be run on an electronic device associated with the headset.

According to an aspect, disclosed is a system comprising a headset and a location-based service software.

According to an aspect, disclosed is a method in a headset for controlling a headset feature. The headset is configured to be worn by a user. The headset comprising a connection to a location-based service software, where the location-based service software is configured for controlling at least one headset feature based on location data of the headset. The method comprises obtaining current location data of the headset. The method comprises detecting if the current location data of the headset corresponds to a geographic region for which a first geo-fence is defined by the user. The method comprises changing the at least one headset feature, if a change criterion associated with the first geofence is satisfied; wherein the change of at least one headset feature is defined by the user.

The present invention relates to different aspects including the headset, software application, system, and method described above and in the following, and corresponding system parts, methods, devices, systems, networks, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
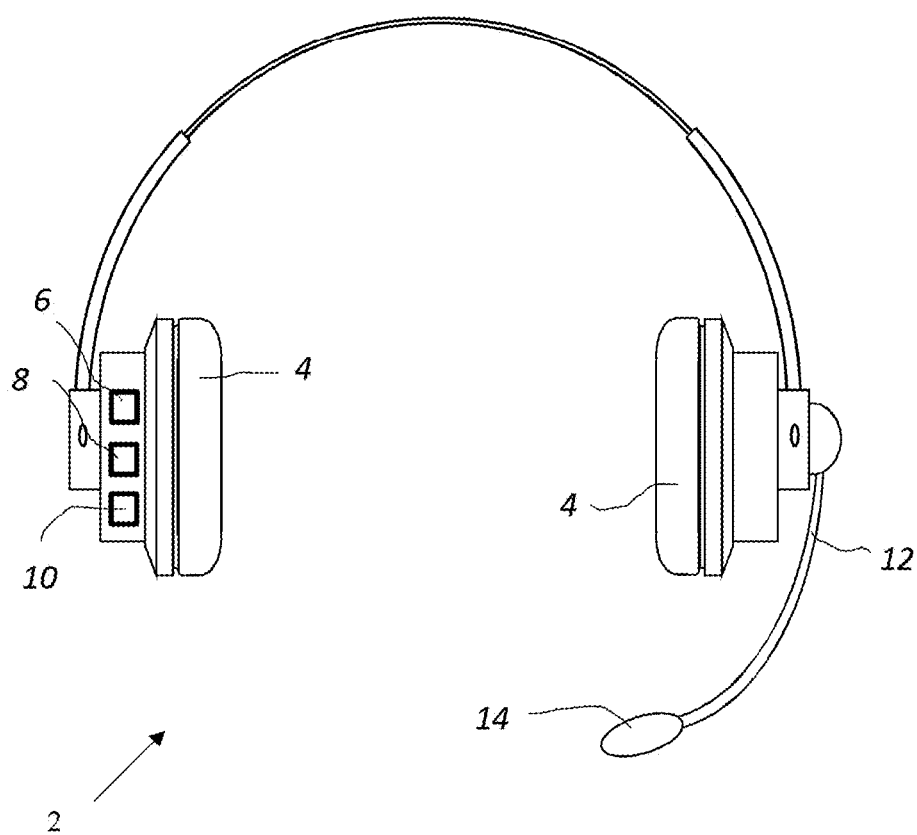
FIG. 1 schematically illustrates an example of a headset.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 schematically illustrates an example of a headset 2 for audio transmission. The headset 2 is configured to be worn by a user. The headset 2 comprises a speaker 4 for sound transmission into the user's ear. The headset 2 comprises a wireless communication unit 6 for communication with an external device. The headset 2 comprises a connection 8 to a location-based service software. The location-based service software is configured for controlling at least one headset feature based on location data of the headset 2. The headset 2 comprises a processing unit 10. The processing unit 10 is configured for obtaining current location data of the headset 2, enabling the location-based service software to detect if the current location data of the headset 2 corresponds to a geographic region for which a first geofence is defined by the user; and changing the at least one headset feature, if a change criterion associated with the first geofence is satisfied; wherein the change of at least one headset feature is defined by the user.

The headset 2 may further comprise a microphone boom 12 with a microphone 14 allowing the user to perform phone call with the headset 2.

Figure 2A:
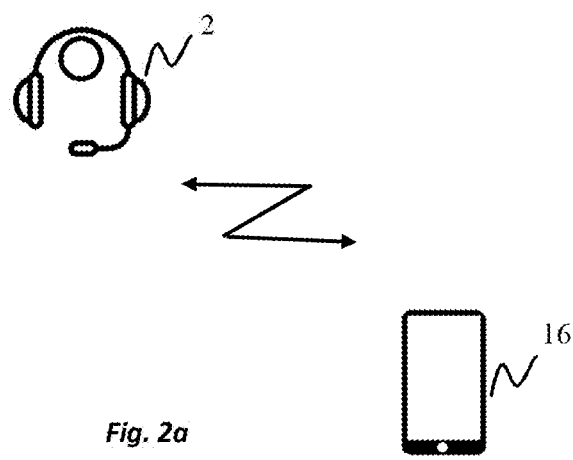
FIGS. 2a) and 2b) schematically illustrate examples of wireless communication between the headset and an external device.

FIGS. 2a) and 2b) schematically illustrate examples of the wireless communication between the headset 2 and an external device 16.

In FIG. 2a) the external device 16 is an electronic device, such as a mobile device, such as a smart phone. The external device 16 may be an electronic device, such as the user's smart phone, if the headset 2 is not configured for Internet connection itself, e.g. a tethered headset 2.

Figure 2B:
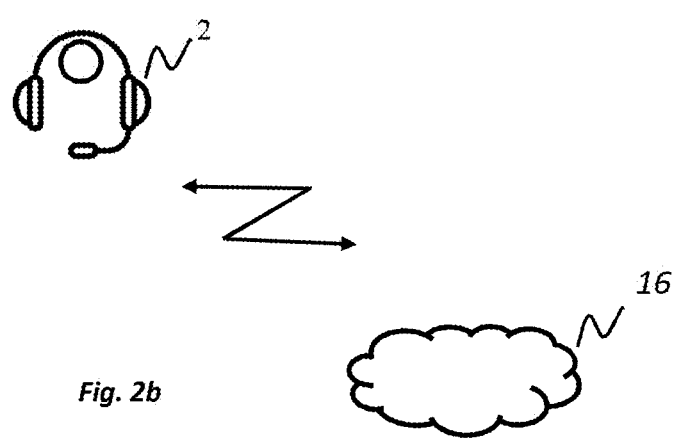

In FIG. 2b) the external device 16 is a server, such as cloud server. The external device 16 may be a server, such as a cloud server, if the headset 2 is configured for Internet connection itself, e.g. an untethered headset 2.

Figure 3A:
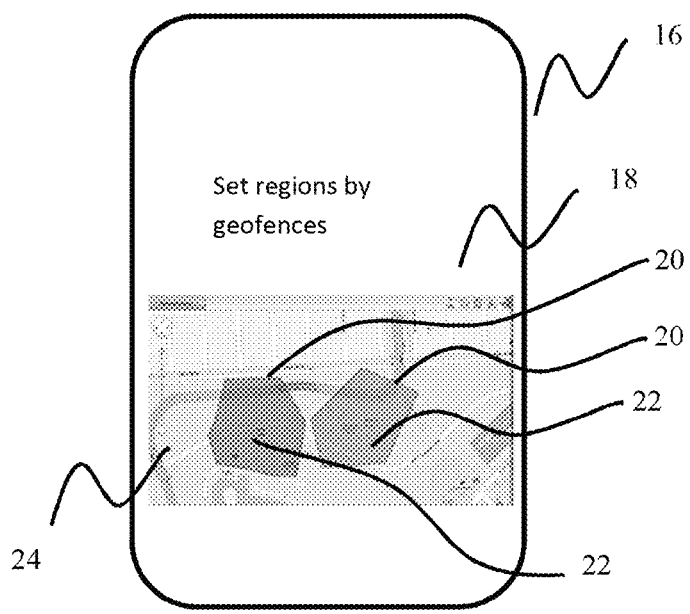
FIGS. 3a) and 3b) schematically illustrate examples of a user interface for defining one or more geofences for geographic regions.

FIGS. 3a) and 3b) schematically illustrate examples of a user interface 18 for defining one or more geofences 20 for geographic regions 22.

FIG. 3a) schematically illustrates a visual user interface 18 on an external device 16 being an electronic device, such as a smart phone. The user may define one or more geofences 20 for geographic regions 22 on a map 24 in the user interface 18. The user may define the geofences for example by drawing areas with his/her finger on the map 24.

Figure 3B:
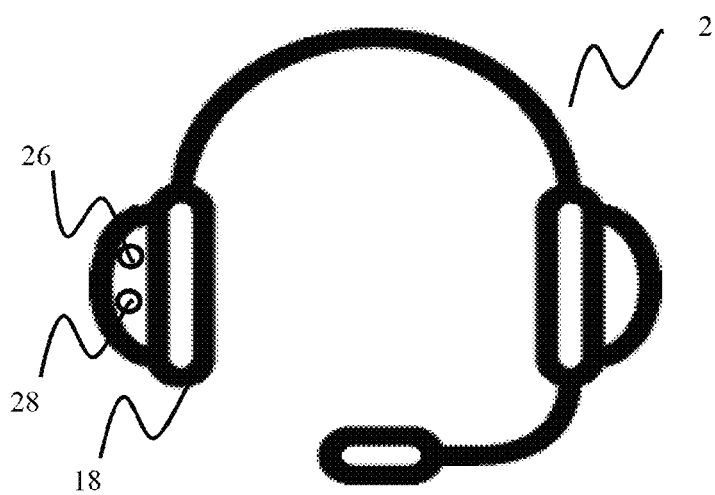

FIG. 3b) schematically illustrates a headset user interface 18 on the headset 2. The user may define one or more geofences 20 while the user is wearing the headset 2, by that when the user enters a geographic region where the user wishes a geofence 20 to begin, the user may indicate to the headset 2 that the geofence 20 shall start here, e.g. by pushing a button 26 on the headset user interface 18 or making a voice prompt to the headset user interface 18. When the user wishes the geofence 20 to end, the user may again indicate to the headset user interface 18 that the geofence shall stop here, e.g. by pushing a button 28 on the headset user interface 18 or making a voice prompt to the headset user interface 18. Thus, the headset 2 may comprise buttons 26, 28 on the headset user interface 18, voice control, gesture control of the headset etc.

Figure 4:
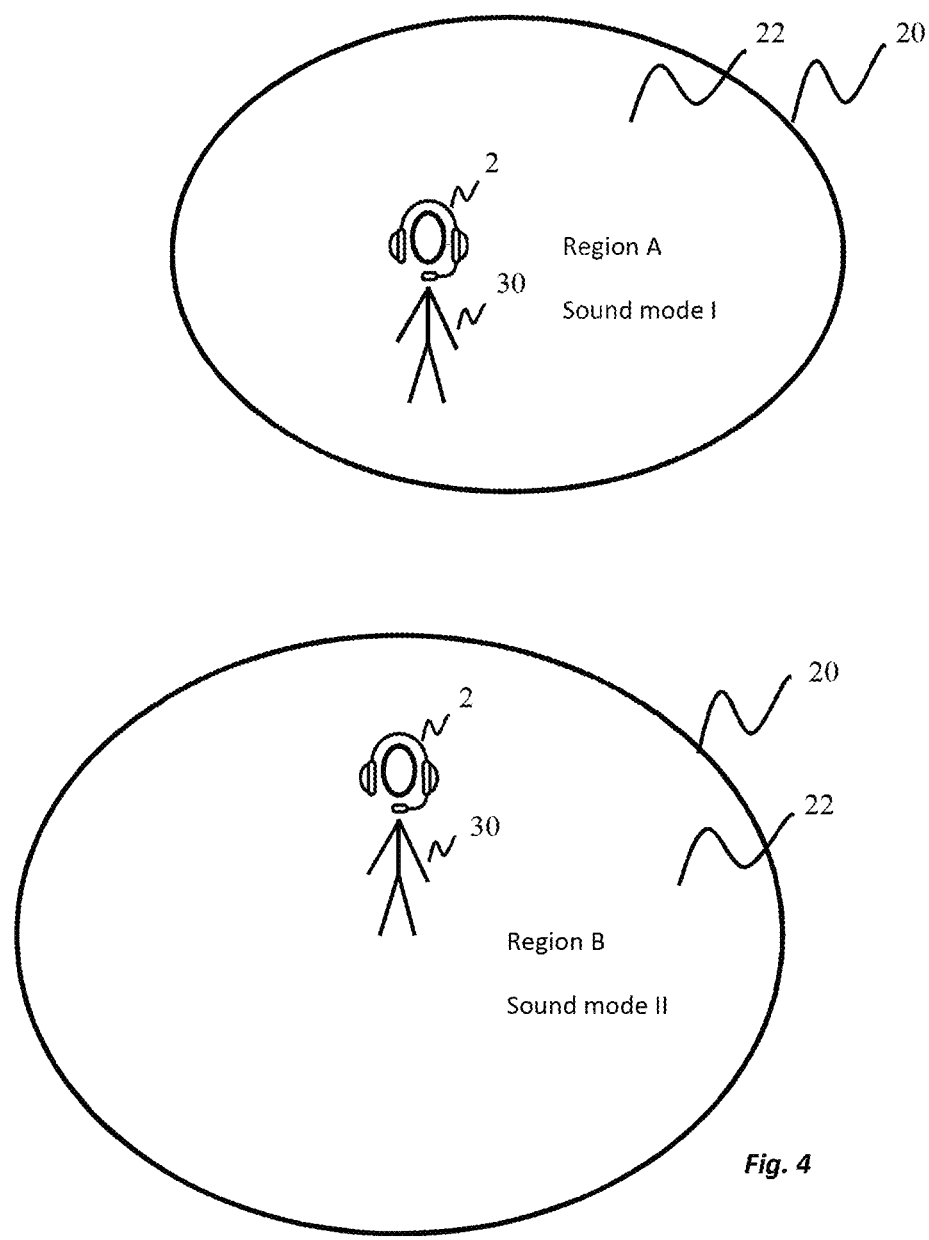
FIG. 4 schematically illustrates an example of a user wearing a headset in geographic regions defined by geofences.

FIG. 4 schematically illustrates an example of a user 30 wearing a headset 2 in geographic regions 22 defined by geofences 20.

The top of FIG. 4 shows the user 30 in the geographic region 22 called Region A defined by a geofence 20. The user is wearing the headset 2. The user 30 has beforehand, see FIGS. 3a) and 3b), defined that in Region A, the headset feature should be sound mode e.g. called "music and no noise cancellation". Region A may for example be the user's home, where the user likes to listen to music in his/he headset 2.

The bottom of FIG. 4 shows the user 30 in the geographic region 22 called Region B defined by a geofence 20. The user is wearing the headset 2. The user 30 has beforehand, see FIGS. 3a) and 3b), defined that in Region B, the headset feature should be sound mode II, e.g. called "noise cancellation and no music". Region B may for example be the user's work place, where the user likes to use noise cancellation in the headset 2.

Figure 5:
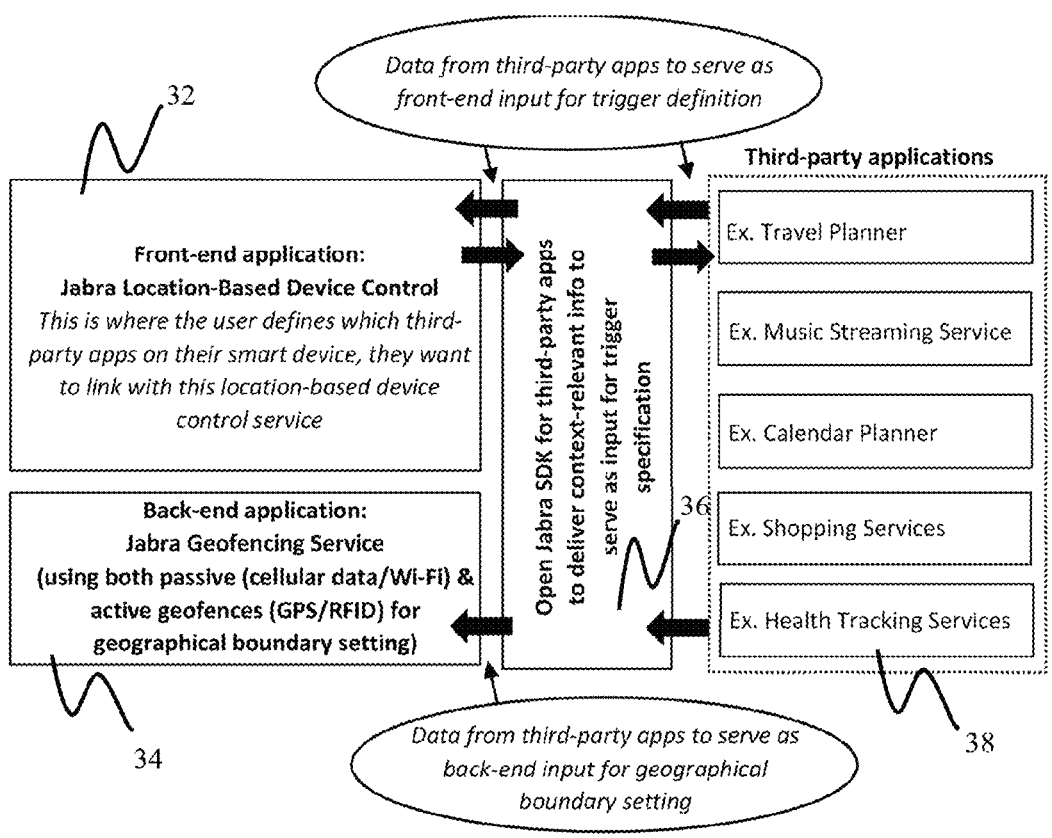
FIG. 5 schematically illustrates an example of input between front-end applications, back-end applications, a headset manufacturer SDK (software development kit) and third-party applications.

FIG. 5 schematically illustrates an example of input between front-end applications 32, back-end applications 34, a headset manufacturer SDK 36 and third-party applications 38.

The headset manufacturer software development kit (SDK or devkit) may be a set of software development tools that allows the creation of applications for a certain software package, software framework, hardware platform, computer system, video game console, operating system, or similar development platform. To enrich applications with advanced functionalities, advertisements, push notifications, and more, app developers may implement specific software development kits. Some SDKs are critical for developing a platform-specific app.

An SDK can take the form of a simple implementation of one or more application programming interfaces (APIs) in the form of on-device libraries to interface to a particular programming language, or it may be as complex as hardware-specific tools that can communicate with a particular embedded system. Common tools include debugging facilities and other utilities, often presented in an integrated development environment (IDE). SDKs may also include sample code and technical notes or other supporting documentation such as tutorials to help clarify points made by the primary reference material.

Thus, the headset manufacturer SDK may be an open software made available such that third part apps may communicate with the back- and front-end applications, on different operating systems, such as Android, IOS etc., and which enables to receive and act on data to control the headset features. The front-end application 32 may be a software application e.g. an app, where the user can define regions in the form of geofences, e.g. on a map in the app, wherein certain headset features and/or headset setting preferences can be defined or set to provide rules. For example, a desired Sound Mode level can be defined for a certain geographical region in the front-end application. A sound mode level may for example be a "hear through level" which the user can set for e.g. the geographical region of his/her workplace. The front-application 32 may be where the user defines which third-party applications 38 on the associated electronic device, e.g. smart device, that the user wants to link with the location-based device control service.

The user's headset may then automatically, via the back-end application 34, know when the user enters or exits a region for which a geofence has been defined by the user. The headset may then automatically trigger a headset feature change or state change in the headset. This headset feature change or state change can affect all or only some selected headset features, this depends on user preference settings.

The back-end applications 34 may be geofencing services using passive geofences, e.g. cellular data/WiFi, and/or active geofences, GPS/RFID, for geographical boundary setting.

The automated state change in the headset may use the same communication 'route' as used for call control today. Thus, the current Bluetooth SCO-protocol may be used. Furthermore, a new protocol, e.g. a headset manufacturer protocol, may be added on top of the current Bluetooth-SCO protocol, which may enable the headset manufacturer SDK 36, to send commands from the back-end applications 34 and/or the front-end application 32 to the headset, with the result of the headset automatically changing settings. Thus, the headset manufacturer SDK 36 may provide that third-party applications 38 can deliver context-relevant information to serve as input for trigger specification. Data from third-party applications 38 can be used to serve as front-end application 32 input for trigger definition. Data from third-party applications 38 can be used to serve as back-end application 34 input for geographical boundary setting.

For example, if the user has set a headset feature being a Sound Mode, e.g. a hear-through sound mode for the headset in a specific region, the effect of leaving or entering that region, may be that the headset automatically—without the user having to give input to neither headset nor front-end application—change from one Sound Mode to another Sound Mode.

Setting triggers for when to change a headset feature may happen in the front-end application 32. Triggers may effect only the headset's generic/built-in settings/features. Alternatively and/or additionally, the triggers can effect change of settings in applicable third-party applications 38 installed on the user's electronic device, e.g. smart phone. The third-part applications 38 may for example be Travel Planner, Music Streaming Service, Calendar Planner, Shopping Services, Health Tracking Services etc.

Thus, the user leaving or entering a region can also create a change in for example a planned travel route, change music tracks/playlists, effect calendar content, alter/activate shopping push notifications or purchase plans or e.g. affect health states/recommendations etc., which are all related to third-party applications 38. In relation to planned travel route, the headset may pair information on the time of entering/exiting a region from back-end application with information from planned travel route. A trigger or consequence may be, that the user may get a voice notification in the headset, if the planned travel conflicts with actual time and/or location. This may furthermore provide that a 'reroute advice' or 'speed-up-pace advice' is given to the user via push notifications, such as voice prompts, in the headset.

In an example with a calendar planner, the user can define that within certain geographical regions, e.g. a geofence defined around the user's home, the user is not interested in being approachable via phone calls, and/or text messages and/or emails from one or more predefined contacts.

Figure 6:
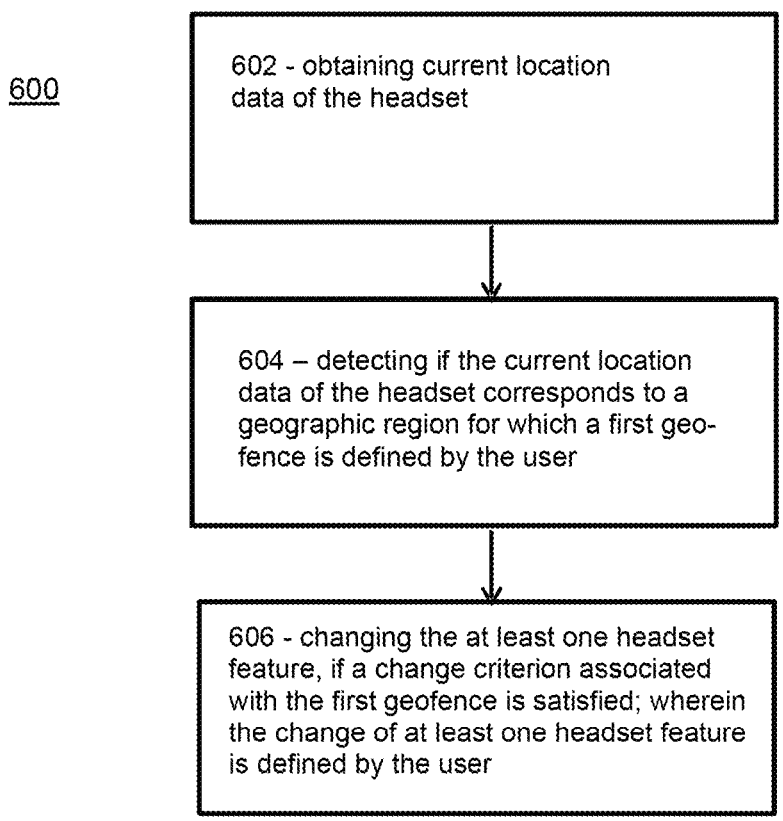
FIG. 6 schematically illustrates an example of a method in a headset for controlling a headset feature.

FIG. 6 schematically illustrates an example of a method 600 in a headset 2 for controlling a headset feature. The headset is configured to be worn by a user. The headset comprises a connection to a location-based service software, where the location-based service software is configured for controlling at least one headset feature based on location data of the headset.

The method 600 comprises the following steps.

In step 602 current location data of the headset is obtained.

In step 604, the method comprises detecting if the current location data of the headset corresponds to a geographic region for which a first geo-fence is defined by the user.

In step 606 at least one headset feature is changed, if a change criterion associated with the first geofence is satisfied; wherein the change of the at least one headset feature is defined by the user.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES 2 headset
4 speaker
6 wireless communication unit
8 connection to location-based service software
10 processing unit
12 microphone arm
14 microphone
16 external device
18 user interface
20 geofence
22 geographic regions
24 map on visual user interface
26 button on headset user interface
28 button on headset user interface
30 user
32 front-end application
34 back-end application
36 headset manufacturer SDK (software development kit)
38 third-party applications
600 method
602 method step of obtaining current location data of the headset;
604 method step of detecting if the current location data of the headset corresponds to a geographic region for which a first geo-fence is defined by the user;
606 method step of changing the at least one headset feature, if a change criterion associated with the first geofence is satisfied; wherein the change of at least one headset feature is defined by the user.

The invention claimed is:

1. A geo-fencing enabled headset for audio transmission, the headset configured to be worn by a user, the headset capable of receiving communications originating from office and non-office/personal data sources, the headset comprising:
   a speaker for sound transmission into the user's ear;
   a wireless communication unit for communication with an external device;
   a connection to a location-based service, the location-based service is configured for controlling at least one headset feature based on location data of the headset;
   a processing unit configured for:
      obtaining current location data of the headset;
         detecting if the current location of the headset, via geo-fencing, corresponds to a geographic region for which a first geo-fence is defined by the user;
         controlling a feature of the headset in response to location of the headset relative to said first geographic region;
         establishing change criteria associated with entering said first geographic region between first enabled feature state and second disabled feature states;
         if said headset enters said first geographic region, changing a feature of the headset to said first feature state; and if the headset exits said first geographic region, changes the feature to said second feature state;
      establishing a first headset sound mode level when the headset is in said first geographic region, and
      wherein said feature includes altering the headset sound mode level to a second sound mode level once the headset leaves said first geographic region, so that office communications to the headset outside of said first geographic region are provided at a different sound mode level relative to the first sound mode level; and
   wherein the change of the headset feature is performed by a call control communication protocol; and wherein the call control communication protocol comprises a protocol enabling sending commands from back-end applications and front-end applications to the headset, thereby changing the headset feature.

2. The headset according to claim 1, wherein the change criterion for changing the headset feature is satisfied, if the user, wearing the headset, enters or exits the geographic region for which the first geo-fence is defined.

3. The headset according to claim 2, wherein the change of the headset feature is performed by a call control communication protocol; and wherein the call control communication protocol comprises a Bluetooth-SCO protocol.

4. The headset according to claim 1, wherein detecting current location includes location-based data and wherein the location-based data is further configured to be used for controlling triggers/notifications from third-party applications based on location data of the headset.

5. The headset according to claim 4, wherein the location data of the headset affects a change in settings in applicable third-party applications on the electronic device based on the user's predefined settings.

6. A geo-fencing enabled headset for audio transmission, the headset configured to be worn by a user, the headset capable of receiving calendar data originating from office and non-office data the headset comprising:
   a speaker for sound transmission into the user's ear;
   a wireless communication unit for communication with an external device;
   a connection to a location-based service, the location-based service is configured for controlling at least one headset feature based on location data of the headset;
   a processing unit configured for:
      obtaining current location data of the headset;
         detecting if the current location data via geo-fencing, of the headset corresponds to a geographic region for which a first geo-fence is defined by the user;
         controlling features of the headset in response to location of the headset relative to said first geographic region;
         establishing change criteria associated with entering said first geographic region between first enabled and second disabled feature states;
         if said headset enters said first geographic region, changing a feature of the headset to said first feature state; and if the headset exits said first geographic region, changes the feature to said second feature state; and
      establishing a first headset sound mode level when the headset is in said first geographic region, and
      wherein said feature includes altering the headset sound mode level to a second sound mode level once the headset leaves said first geographic region, so that office communications to the headset outside of said first geographic region are provided at a different sound mode level relative to the first sound mode level.

7. The headset according to claim 6, wherein the location data of the headset is determined in the headset, when the headset comprises a geographic locating system for location determination; and wherein the location data of the headset is determined in the electronic device.

8. The headset according to claim 7 wherein the headset comprises an internet connection such that the headset is configured for connection to the internet.

9. A system for providing geo-fencing features to a headset enabling a user to define settings for a location-based control of at least one headset feature based on location data of the headset, the system comprising:
   a user interface comprising display of a map for a geographic area enabling the user to define one or more geo-fences including a first geo-fence for a geographic region on the map;
   a user interface enabling the user to define a change of at least one headset feature based on the location-data of the headset, wherein the headset feature is configured to be changed from a first enabled status state to a second disabled status state defined by blocking push notifications to the headset once the headset leaves said first geographic region, so that office communications to the headset outside of said first geographic region are blocked.

10. The system according to claim 9, wherein the system comprises a user interface enabling the user to select/define one or more third-party applications, which are affected by the headset feature and/or by the location-data of the headset.

11. The system according to claim 10, wherein the system comprises a user interface enabling the user to select/define one or more third-party applications, which are configured to affect the headset feature based on the location-data of the headset.

12. A system comprising a headset according to claim 1, and further including a geo-fencing capability, for enabling a user to define settings for a location-based service for controlling at least one headset feature based on location data of the headset, the system comprising:
- a user interface comprising display of a map for a geographic area enabling the user to define one or more geo-fences including a first geo-fence for a geographic region on the map;
- a user interface enabling the user to define a change of at least one headset feature based on the location-data of the headset, wherein the headset feature is configured to be changed from a first status state to a second status state, if the user, wearing the headset, enters or exits the geographic region for which the first geo-fence is defined/set.

13. A geo-fencing enabled headset for audio transmission, the headset configured to be worn by a user, the headset capable of receiving communications originating from an office and from non-office/personal data sources, the headset comprising:
- a speaker for sound transmission into the user's ear;
- a wireless communication unit for communication with an external device;
- a connection to a location-based service data, the location-based service data is used for controlling at least one headset feature based on location data of the headset;
- a processing unit configured for:
  - obtaining current location data of the headset;
  - detecting if the current location data of the headset corresponds to a geographic region by geo-fencing for which a first geo-fence is defined by the user;
  - controlling features of the headset in response to location of the headset relative to said first geographic region;
  - establishing change criteria associated with entering said first geographic region by geo-fencing between first and second feature states;
  - if said headset enters said first geographic region, changing a feature of the headset to said first feature state; and if the headset exits said first geographic region, changes the feature to said second feature state;
  - wherein said at least one headset feature includes blocking all office communication data sources containing of the headset once the headset enters said first geographic region, so that office communications to the headset outside of said first geographic region are blocked while personal communications to the headset are allowed.

* * * * *